(12) United States Patent
Whitby-Strevens

(10) Patent No.: US 7,861,025 B2
(45) Date of Patent: *Dec. 28, 2010

(54) METHOD AND APPARATUS FOR AUTOMATIC DETECTION AND HEALING OF SIGNAL PAIR CROSSOVER ON A HIGH PERFORMANCE SERIAL BUS

(75) Inventor: Colin Whitby-Strevens, Bristol (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/218,366

(22) Filed: Jul. 14, 2008

(65) Prior Publication Data

US 2008/0294833 A1 Nov. 27, 2008

Related U.S. Application Data

(63) Continuation of application No. 11/139,815, filed on May 27, 2005, now Pat. No. 7,401,173, which is a continuation of application No. 10/464,169, filed on Jun. 17, 2003, now Pat. No. 6,944,705, which is a continuation of application No. 09/557,073, filed on Apr. 21, 2000, now Pat. No. 6,618,785.

(51) Int. Cl.
*G06F 13/14* (2006.01)

(52) U.S. Cl. .................................. 710/305; 710/316

(58) Field of Classification Search ............... 361/246; 710/305, 316, 10, 100, 104, 105, 107, 119, 710/124, 5, 8, 40

See application file for complete search history.

(56) References Cited

U.S. PATENT DOCUMENTS

| | | | |
|---|---|---|---|
| 3,859,468 A | 1/1975 | Smith et al. | |
| 4,156,798 A | 5/1979 | Doelz | |
| 4,194,113 A | 3/1980 | Fulks et al. | |
| 5,014,262 A | 5/1991 | Harshavardhana | |
| 5,175,855 A | 12/1992 | Putnam et al. | |
| 5,257,160 A * | 10/1993 | Yokohama et al. | .......... 361/246 |
| 5,274,631 A | 12/1993 | Bhardwaj | |
| 5,321,812 A | 6/1994 | Benedict et al. | |
| 5,343,461 A | 8/1994 | Barton et al. | |
| 5,390,301 A | 2/1995 | Scherf | |
| 5,394,106 A | 2/1995 | Black et al. | |
| 5,394,486 A | 2/1995 | Eisenbarth et al. | |
| 5,394,556 A * | 2/1995 | Oprescu | ...................... 709/220 |
| 5,406,643 A | 4/1995 | Burke et al. | |
| 5,430,486 A | 7/1995 | Fraser et al. | |
| 5,438,571 A | 8/1995 | Albrecht et al. | |

(Continued)

FOREIGN PATENT DOCUMENTS

JP 04180431 6/1992

OTHER PUBLICATIONS

Structured Computer Organization, Third Edition, Andrew S. Tanenbaum pp. 11-13 copyright 1976.

*Primary Examiner*—Paul R Myers
(74) *Attorney, Agent, or Firm*—Gazdzinski & Associates, PC

(57) ABSTRACT

An automatic crossover and healing process is disclosed for the P1394b standard. In particular, a crossover process is disclosed which comprises coupling the transmitting logic of a PHY to TPA, and coupling the receive logic of a PHY to TPB.

44 Claims, 7 Drawing Sheets

Crossover Algorithm
According to the Present Invention

U.S. PATENT DOCUMENTS

| | | |
|---|---|---|
| 5,452,330 A | 9/1995 | Goldstein |
| 5,490,250 A | 2/1996 | Reschke et al. |
| 5,490,253 A | 2/1996 | Laha et al. |
| 5,493,568 A | 2/1996 | Sampat et al. |
| 5,495,481 A | 2/1996 | Duckwall |
| 5,524,254 A | 6/1996 | Morgan et al. |
| 5,539,390 A | 7/1996 | Nagano et al. |
| 5,541,670 A | 7/1996 | Hanai |
| 5,559,548 A | 9/1996 | Davis et al. |
| 5,563,886 A | 10/1996 | Kawamura et al. |
| 5,568,487 A | 10/1996 | Sitbon et al. |
| 5,568,641 A | 10/1996 | Nelson et al. |
| 5,577,023 A | 11/1996 | Marum et al. |
| 5,583,922 A | 12/1996 | Davis et al. |
| 5,591,034 A | 1/1997 | Ameen et al. |
| 5,621,659 A | 4/1997 | Matsumoto et al. |
| 5,630,173 A | 5/1997 | Oprescu |
| 5,632,016 A | 5/1997 | Hoch et al. |
| 5,640,595 A | 6/1997 | Baugher et al. |
| 5,642,515 A | 6/1997 | Jones et al. |
| 5,654,657 A | 8/1997 | Pearce |
| 5,684,715 A | 11/1997 | Palmer |
| 5,701,476 A | 12/1997 | Fenger |
| 5,701,492 A | 12/1997 | Wadsworth et al. |
| 5,706,278 A | 1/1998 | Robillard et al. |
| 5,712,834 A | 1/1998 | Nagano et al. |
| 5,719,862 A | 2/1998 | Lee et al. |
| 5,754,765 A | 5/1998 | Danneels et al. |
| 5,764,930 A | 6/1998 | Staats |
| 5,784,648 A | 7/1998 | Duckwall |
| 5,802,048 A | 9/1998 | Duckwall |
| 5,802,057 A | 9/1998 | Duckwall et al. |
| 5,802,365 A | 9/1998 | Kathail et al. |
| 5,805,073 A | 9/1998 | Nagano et al. |
| 5,805,822 A * | 9/1998 | Long et al. .................. 709/232 |
| 5,809,331 A | 9/1998 | Staats et al. |
| 5,819,115 A | 10/1998 | Hoese et al. |
| 5,826,027 A | 10/1998 | Pedersen et al. |
| 5,832,298 A | 11/1998 | Sanchez et al. |
| 5,835,761 A | 11/1998 | Ishii et al. |
| 5,844,619 A | 12/1998 | Songer |
| 5,845,152 A | 12/1998 | Anderson et al. |
| 5,867,730 A | 2/1999 | Leyda |
| 5,875,301 A | 2/1999 | Duckwall et al. |
| 5,923,663 A | 7/1999 | Bontemps et al. |
| 5,930,480 A | 7/1999 | Staats |
| 5,935,208 A | 8/1999 | Duckwall et al. |
| 5,938,764 A | 8/1999 | Klein |
| 5,940,600 A | 8/1999 | Staats et al. |
| 5,950,066 A | 9/1999 | Hanson et al. |
| 5,954,796 A | 9/1999 | McCarty et al. |
| 5,959,971 A | 9/1999 | Sakai |
| 5,968,152 A | 10/1999 | Staats |
| 5,970,052 A | 10/1999 | Lo et al. |
| 5,987,605 A | 11/1999 | Hill et al. |
| 5,991,842 A | 11/1999 | Takayama |
| 6,006,275 A | 12/1999 | Picazo, Jr. et al. |
| 6,009,480 A | 12/1999 | Pleso |
| 6,032,202 A | 2/2000 | Lea et al. |
| 6,032,261 A | 2/2000 | Hulyalkar |
| 6,038,234 A | 3/2000 | LaFollette et al. |
| 6,038,625 A | 3/2000 | Ogino et al. |
| 6,041,286 A | 3/2000 | White |
| 6,054,520 A | 4/2000 | Washio et al. |
| 6,070,187 A | 5/2000 | Subramaniam et al. |
| 6,073,206 A | 6/2000 | Piwonka et al. |
| 6,091,726 A | 7/2000 | Crivellari et al. |
| 6,108,301 A | 8/2000 | Laudon |
| 6,115,764 A | 9/2000 | Chisholm et al. |
| 6,118,486 A | 9/2000 | Reitmeier |
| 6,122,248 A | 9/2000 | Murakoshi et al. |
| 6,131,129 A | 10/2000 | Ludtke et al. |
| 6,131,134 A | 10/2000 | Huang et al. |
| 6,131,163 A | 10/2000 | Wiegel |
| 6,133,938 A | 10/2000 | James |
| 6,138,163 A | 10/2000 | Nam et al. |
| 6,138,196 A | 10/2000 | Takayama et al. |
| 6,141,702 A | 10/2000 | Ludtke et al. |
| 6,141,767 A | 10/2000 | Hu et al. |
| 6,145,018 A | 11/2000 | LaFollette et al. |
| 6,157,972 A | 12/2000 | Newman et al. |
| 6,160,796 A | 12/2000 | Zou |
| 6,167,532 A | 12/2000 | Wisecup |
| 6,173,327 B1 | 1/2001 | De Borst et al. |
| 6,175,865 B1 * | 1/2001 | Dove et al. .................. 709/220 |
| 6,178,445 B1 | 1/2001 | Dawkins et al. |
| 6,185,622 B1 | 2/2001 | Sato |
| 6,188,700 B1 | 2/2001 | Kato et al. |
| 6,192,189 B1 | 2/2001 | Fujinami et al. |
| 6,192,397 B1 | 2/2001 | Thompson |
| 6,199,119 B1 | 3/2001 | Duckwall et al. |
| 6,202,210 B1 | 3/2001 | Ludtke |
| 6,212,171 B1 | 4/2001 | LaFollette et al. |
| 6,212,633 B1 | 4/2001 | Levy et al. |
| 6,219,697 B1 | 4/2001 | Lawande et al. |
| 6,226,680 B1 | 5/2001 | Boucher et al. |
| 6,233,615 B1 | 5/2001 | Van Loo |
| 6,233,624 B1 | 5/2001 | Hyder et al. |
| 6,243,778 B1 | 6/2001 | Fung et al. |
| 6,247,063 B1 | 6/2001 | Ichimi et al. |
| 6,247,083 B1 | 6/2001 | Hake et al. |
| 6,253,114 B1 | 6/2001 | Takihara |
| 6,253,255 B1 | 6/2001 | Hyder et al. |
| 6,256,059 B1 | 7/2001 | Fichtner |
| 6,260,063 B1 | 7/2001 | Ludtke et al. |
| 6,266,334 B1 | 7/2001 | Duckwall |
| 6,266,344 B1 | 7/2001 | Fujimori et al. |
| 6,266,701 B1 | 7/2001 | Sridhar et al. |
| 6,275,889 B1 | 8/2001 | Saito |
| 6,278,838 B1 | 8/2001 | Mendenhall et al. |
| 6,282,597 B1 | 8/2001 | Kawamura |
| 6,292,840 B1 | 9/2001 | Blomfield-Brown et al. |
| 6,295,479 B1 | 9/2001 | Shima et al. |
| 6,308,222 B1 | 10/2001 | Krueger et al. |
| 6,311,228 B1 | 10/2001 | Ray |
| 6,314,461 B2 | 11/2001 | Duckwall et al. |
| 6,343,321 B2 | 1/2002 | Patki et al. |
| 6,345,315 B1 | 2/2002 | Mishra |
| 6,347,362 B1 | 2/2002 | Schoinas et al. |
| 6,353,868 B1 | 3/2002 | Takayama et al. |
| 6,356,558 B1 | 3/2002 | Hauck et al. |
| 6,363,085 B1 | 3/2002 | Samuels |
| 6,373,821 B2 | 4/2002 | Staats |
| 6,385,679 B1 | 5/2002 | Duckwall et al. |
| 6,405,247 B1 | 6/2002 | Lawande et al. |
| 6,411,628 B1 | 6/2002 | Hauck et al. |
| 6,418,150 B1 | 7/2002 | Staats |
| 6,425,019 B1 | 7/2002 | Tateyama et al. |
| 6,426,062 B1 | 7/2002 | Chopra et al. |
| 6,426,962 B1 | 7/2002 | Cabezas et al. |
| 6,429,902 B1 | 8/2002 | Har-Chen et al. |
| 6,442,630 B1 | 8/2002 | Takayama et al. |
| 6,446,116 B1 | 9/2002 | Burridge |
| 6,446,142 B1 | 9/2002 | Shima et al. |
| 6,452,975 B1 | 9/2002 | Hannah |
| 6,457,086 B1 | 9/2002 | Duckwall |
| 6,466,982 B1 | 10/2002 | Ruberg |
| 6,473,561 B1 | 10/2002 | Heo |
| 6,496,862 B1 | 12/2002 | Akatsu et al. |
| 6,502,144 B1 | 12/2002 | Accarie |
| 6,513,085 B1 | 1/2003 | Gugel et al. |
| 6,519,657 B1 | 2/2003 | Stone et al. |
| 6,529,522 B1 | 3/2003 | Ito et al. |
| 6,574,588 B1 | 6/2003 | Shapiro et al. |

| | | | | | | |
|---|---|---|---|---|---|---|
| 6,580,591 B2 | 6/2003 | Landy | | 6,718,497 B1 | 4/2004 | Whitby-Strevens |
| 6,580,694 B1 | 6/2003 | Baker | | 6,745,256 B2 | 6/2004 | Suzuki et al. |
| 6,587,904 B1 | 7/2003 | Hauck et al. | | 6,763,175 B1 | 7/2004 | Trottier et al. |
| 6,591,300 B1 | 7/2003 | Yurkovic | | 6,766,163 B1 | 7/2004 | Sharma |
| 6,606,320 B1 | 8/2003 | Nomura et al. | | 6,813,663 B1 | 11/2004 | Brown |
| 6,614,236 B1 | 9/2003 | Karam | | 6,831,928 B1 | 12/2004 | Hauck et al. |
| 6,618,750 B1 | 9/2003 | Staats | | 6,839,791 B2 | 1/2005 | Duckwall |
| 6,618,764 B1 | 9/2003 | Shteyn | | 6,944,705 B1 | 9/2005 | Whitby-Strevens |
| 6,618,785 B1 | 9/2003 | Whitby-Strevens | | 2001/0001151 A1 | 5/2001 | Duckwall et al. |
| 6,621,832 B2 | 9/2003 | Staats | | 2001/0019561 A1 | 9/2001 | Staats |
| 6,628,607 B1 | 9/2003 | Hauck et al. | | 2001/0024423 A1 | 9/2001 | Duckwall et al. |
| 6,631,426 B1 | 10/2003 | Staats | | 2002/0103947 A1 | 8/2002 | Duckwall et al. |
| 6,636,914 B1 | 10/2003 | Teener | | 2002/0188780 A1 | 12/2002 | Duckwall |
| 6,639,918 B1 | 10/2003 | Hauck et al. | | 2002/0188783 A1 | 12/2002 | Duckwall et al. |
| 6,643,714 B1 | 11/2003 | Chrysanthakopoulos | | 2003/0037161 A1 | 2/2003 | Duckwall et al. |
| 6,661,805 B1 | 12/2003 | Romano et al. | | 2003/0055999 A1 | 2/2003 | Duckwall et al. |
| 6,671,768 B1 | 12/2003 | Brown | | 2003/0196211 A1 | 10/2003 | Chan |
| 6,686,838 B1 | 2/2004 | Rezvani et al. | | 2004/0252231 A1 | 12/2004 | Agnoli et al. |
| 6,691,096 B1 | 2/2004 | Staats | | 2004/0252339 A1 | 12/2004 | Toda |
| 6,700,895 B1 | 3/2004 | Kroll | | | | |
| 6,711,574 B1 | 3/2004 | Todd et al. | | * cited by examiner | | |

P1394b Cable

P1394b Connection

P1394b Connection

P1394b Connection

Crossover Algorithm
According to the Present Invention

Crossover Algorithm
According to the Present Invention

METHOD AND APPARATUS FOR AUTOMATIC DETECTION AND HEALING OF SIGNAL PAIR CROSSOVER ON A HIGH PERFORMANCE SERIAL BUS

CROSS REFERENCE TO RELATED APPLICATIONS

This application is a continuation of and claims priority to co-owned U.S. patent application Ser. No. 11/139,815 entitled "Method and Apparatus For Automatic Detection and Healing of Signal Pair Crossover On A High Performance Serial Bus" filed May 27, 2005 now U.S. Pat. No. 7,401,173, which is a Continuation of U.S. patent application Ser. No. 10/464,169, filed Jun. 17, 2003, now issued as U.S. Pat. No. 6,944,705, which is a Continuation of U.S. patent application Ser. No. 09/557,073, filed Apr. 21, 2000, now issued as U.S. Pat. No. 6,618,785, the entirety of each of the foregoing being incorporated by reference herein.

BACKGROUND OF THE INVENTION

1. Field of the Invention

The present invention relates to data communications. In particular, the present invention relates to automatic detection of signal pair crossover on a high performance serial bus system.

2. The Prior Art

BACKGROUND

The IEEE 1394-1995 standard has revolutionized the consumer electronics industry by providing a serial bus management system that featured high speeds and the ability to "hot" connect equipment to the bus; that is, the ability to connect equipment without first turning off the existing connected equipment. Since its adoption, the IEEE 1394-1995 standard has begun to see acceptance in the marketplace with many major electronics and computer manufacturers providing IEEE 1394-1995 connections on equipment that they sell.

However, as technologies improved, the need to update the IEEE 1394-1995 standard became apparent. A new standard is being proposed at the time of the filing of this application, herein referred to as the P1394b standard. Improvements such as higher speeds and longer connection paths will be provided. It is contemplated at the time of this filing that cable lengths of up to 100 meters may be possible using the P1394b standard. Furthermore, the connections between 1394 devices may be established using wiring previously installed in buildings compliant with appropriate regulatory codes.

In the discussion that follows, it will be necessary to distinguish between the various standards that are being proposed as of the date of this application. Additionally, it will be necessary to distinguish hardware and packet transmissions that are compatible with the P1394b standard and not earlier standards.

Thus, the term "Legacy" will be used herein to refer to the IEEE 1394-1995 standard and all supplements thereof prior to the P1394b standard. Thus, for example, a Legacy node refers to a node compatible with the IEEE 1394-1995 standard and all supplements thereof up to, but not including, the P1394b standard.

Furthermore, in the discussion that follows cable physical layers (PHYs) that are compatible with the P1394b standard may be referred to in various ways, depending upon the context the PHY is operating in and the capability of the PHY.

For example, a PHY that has circuitry compatible with the P1394b standard but not any previous standards will be referred to as a B only PHY. Also, a PHY that is compatible with both the P1394b standard and all predecessors and is communicating with only devices compatible with the P1394b standard will be referred to as B PHYs. Finally, a PHY that is communicating with both Legacy devices and devices compatible with the P1394b standard will be referred to as a border device, border PHY, or border node. Finally, a communications system that has only B PHYs attached will be referred to as a B bus.

P1394b Cabling

FIG. 1 shows a prior art diagram of a cable 100 according to the P1394b standard. Cable 100 includes a first signal pair 105 covered by a shield 106, a second signal pair 107 covered by a shield 108, and a power pair 104. The pairs are then enclosed in an outer shield 102, and extruded in an outer jacket 101.

According to the P1394b standard, the first and second signal pairs 105 and 107 form a differential pair, with different information being transmitted through each signal pair. As is appreciated by those of ordinary skill in the art, when a cable is connected to P1394b-compliant device, the device will receive information on a signal pair designated as twisted pair A (TPA), and will transmit on a signal pair designated as twisted pair B (TPB).

FIG. 2 shows a diagram of a prior art P1394b connection. FIG. 2 includes a PHY 1 having a connection point TPA and TPB, and a PHY 2 having a connection point TPA and TPB. Together, a TPA and TPB pair comprises a port. PHYs 1 and 2 are connected via cable 200, which has a first signal pair 202 and a second signal pair 204.

As can be seen by inspection of FIG. 2, because the PHYs transmit and receive on different signal pairs, the first and second signal pairs must be "crossed-over" to properly couple the PHYs. Thus, in FIG. 2, first signal pair 202 is connected to PHY 2's TPB and must be crossed-over to be connected to PHY 1's TPA. The same is true for second signal pair 204. As is appreciated by those of ordinary skill in the art, the signal pair crossover is typically accomplished within the P1394b cabling itself.

In P1394b, a PHY engages in simultaneous transmission and reception called 'dual simplex'. This is different from Legacy, which transmits data on TPB and a "strobe" signal on TPA. Its peer port receives the data on TPA and the strobe on TPB. Legacy operates in "half duplex", whereby previous arbitration determines the direction of the data flow on any given connection. The two connected ports then prime themselves so that one port transmits and one port receives as described above. Because of the strobe signal, Legacy operation requires the use of a crossover, and there is no possibility for operation if the crossover is not provided. To facilitate backwards compatibility, P1394b specifies that the port transmits on TPB and receives on TPA.

FIG. 3 is a diagram of a prior art P1394b system. Where similar designations are used herein, they are intended to refer to substantially similar matter. FIG. 3 shows what is referred to as a "cluster" of PHYs 1, 2, and 3. The PHYs may represent P1394b-compliant devices such as a computer, video camera, and a mass storage device. In FIG. 3, the PHYs are each connected to each other by a cable 200 in a point-to-point fashion to form the cluster. When devices are connected as in FIG. 3, the crossover normally provided in the cabling is sufficient to provide a proper connection for P1394b devices.

However, one of the advantages of the P1394b standard is the ability to run long lengths of cable (as far as 100 m) and connect P1394b devices throughout a house which has preexisting wiring, for example. This leads to the problem illustrated in the diagram of FIG. 4.

FIG. 4 shows PHY 1 connected to PHY 2, through a wall connection. As is known by those of ordinary skill in the art, when a house is wired for point-to-point connections through a wall, typically wiring is used that will not implement a crossover. FIG. 4 shows such a straight-through wire 400 having conductors 402 and 404 which are not crossed-over internally, and external wall connections pairs 406 and 408.

As can be seen by inspection of FIG. 4, if a user attempts to connect PHY 1 to PHY 2 using a cable such as straight-through cable 400, the TPB1 will be coupled to TPB2 through the wall connection as shown with the solid black conductor, and TPA1 will be coupled to TPA2 as shown with the dashed conductor path. As is appreciated by those of ordinary skill in the art, such a connection will not function properly, and PHY 1 will not communicate properly with PHY 2.

To solve the problem of FIG. 4, two types of patch cords are used which are commonly available. One patch cord implements the crossover and one does not. This solution is tolerable in commercial buildings, where professional network managers ensure that the correct type of cable is used in each circumstance, and also where devices are typically connected semi-permanently.

However, this situation of FIG. 4 leads to frustrating difficulties in the consumer environment, where the subtleties of "cross-over" and "straight-through" patch cables are bewildering.

Furthermore, patch cords have certain drawbacks. For example, patch cords require much trial-and-error to locate and correct the connection that is not crossed-over, causing much user confusion and frustration. Furthermore, in modern homes and businesses which utilize P1394b-compliant devices, often all devices are coupled to a central router through in-wall wiring, making any troubleshooting effort even more difficult.

Hence, there is a need for a method and apparatus for automatically healing a crossover problem in a P1394b-compliant system. Furthermore, there is a need for a method and apparatus for automatically healing a crossover in the P1394b environment without the need for different types of patch cords.

BRIEF DESCRIPTION OF THE INVENTION

The present invention satisfies the foregoing needs by providing, inter alia, methods and apparatus for automatic detection of signal pair crossover on a high performance serial bus system. In accordance with a first aspect of the invention, a data communication apparatus is disclosed. In one embodiment, the data communication apparatus includes: a transmit interface configured to transmit a first predetermined signal on power up; a receive interface configured to receive a second predetermined signal; the data communication apparatus configured to perform a crossover function if the receive interface does not receive the second predetermined signal. In one variant, the crossover function includes: examining a random value, the random value being determined by an algorithm, and if the value of the random value meets a predetermined criterion, then: configuring the transmit interface to receive the second predetermined signal; and configuring the receive interface to transmit the first predetermined signal. In another embodiment, the apparatus includes a first interface configured to transmit at least a first signal; a second interface configured to receive at least a second signal; and logic in signal communication with the first interface and the second interface. In one variant, the logic is configured to: wait for a predetermined period after transmission of the first signal; and check the second interface, after the predetermined period has expired, to determine if the second signal is received; and: if the second signal is received at the second interface, then attempt to form a network; and if the second signal is not received at the second interface, and the first or second interfaces are not in use at that time, then performing detection of the second signal on the first interface. In yet another variant, the logic is configured to: check the second interface to determine if the second signal is received; if the second signal is received at the second interface, attempt to form a network; and if the second signal is not received at the second interface, and one or more of the first or second interfaces are in use at that time, then: (i) wait for a predetermined period; and (ii) after expiration of the period, perform detection of the second signal on the first interface.

In accordance with a second aspect of the invention, a communication network comprising at least two nodes and a communication bus is disclosed. In one embodiment, the at least two nodes communicate with each other over the communication bus without an intervening crossover interface; and at least one of the at least two nodes is configured for detection and healing a crossover in communication. The detection and healing includes: detecting an absence of a first signal; determining whether a signal interface of the at least one of the at least two nodes is generating a second signal; and responsive to a probabilistic function and the acts of detecting and determining, switching between a transmit port and a receive port. In one variant, the crossover interface includes a cable, and the at least two nodes comprise nodes compliant with IEEE Std.1394b. In a further variant, the first signal includes a signal detect tone compliant with IEEE Std.1394b. In a further variant, the probabilistic function includes a Boolean function. In a further variant, the probabilistic function is used by the at least two nodes for root node decision. In a further variant, the detection and healing further includes transmitting a predetermined number of transmissions of a second signal.

In accordance with a third aspect of the invention, a communication system is disclosed. In one embodiment, the communication system includes: an interface comprising a first communication path and a second communication path; at least one node; the node including a logic circuit comprising a receive circuit and a transmit circuit; wherein the transmit circuit is connected to a first and a second communication paths via a first passgate and the receive circuit is connected to the first and the second communication paths via a second passgate. The first passgate is utilized in combination with a crossover function and in response to a crossover enable signal, connects the transmit circuit either to the first communication path or the second communication path. The second passgate is utilized in combination with the crossover function and in response to the crossover enable signal, connects the receive circuit either to the first communication path or the second communication path A logical state of the crossover enable signal is responsive to detection of a signal on the second communication path and a value of a first variable, the value of the first variable being determined by an algorithm that is utilized for another purpose in addition to the crossover function. In one variant, another purpose includes resolving contention between the at least one node and one or more other nodes of a network using a serialized bus protocol.

In accordance with a fourth aspect of the invention, a home network comprising at least two devices and a communication bus is disclosed. In one embodiment, the communication bus includes a first signal transmission path and a second signal transmission path; and at least one of the at least two devices includes a physical layer configured to detect reception of a signal on the second signal transmission path; and if the physical layer has not received the signal, then responsive to the lack of receipt of the signal examining a variable associated with a randomized function and implementing, by the physical layer, a crossover process.

In accordance with a fifth aspect of the invention, a method of forming a network is disclosed. In one embodiment, the method includes: transmitting a first signal on a first interface; waiting for a predetermined period of time after completion of the transmitting; checking at a second interface, after the predetermined period of time is over after the transmitting, if a second signal is received; and if the second signal is received at the second interface, then attempting to form a network; and if the second signal is not received at the second interface, and the first signal is determined not to be transmitted on the first or second interface at that time, then performing detection of the second signal on the first interface.

BRIEF DESCRIPTION OF THE DRAWING FIGURES

DETAILED DESCRIPTION OF PREFERRED EMBODIMENTS

Figure 1:
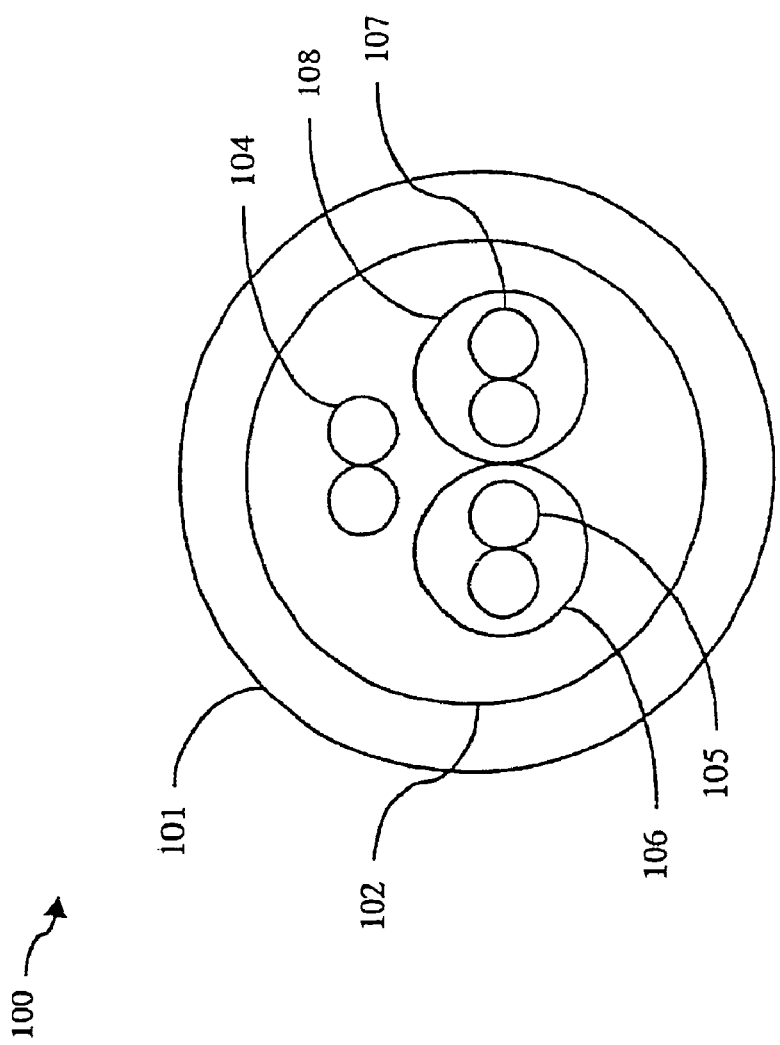
FIG. 1 is a diagram of a prior art P1394b cable.
Figure 2:
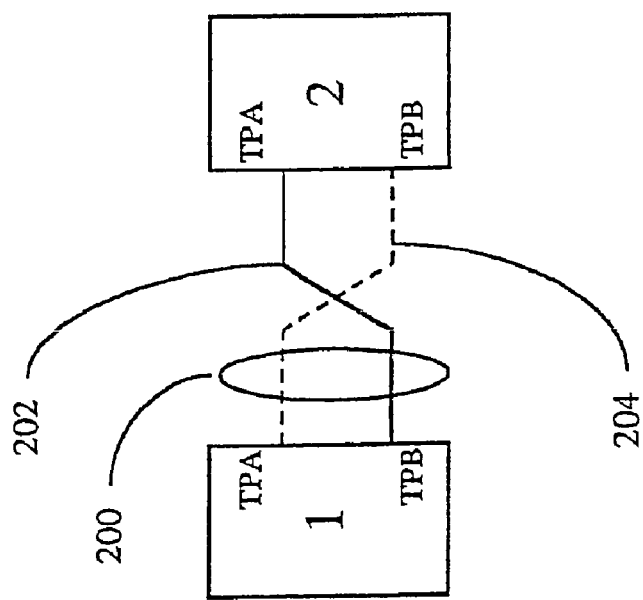
FIG. 2 is a diagram of a prior art P1394b connection.
Figure 3:
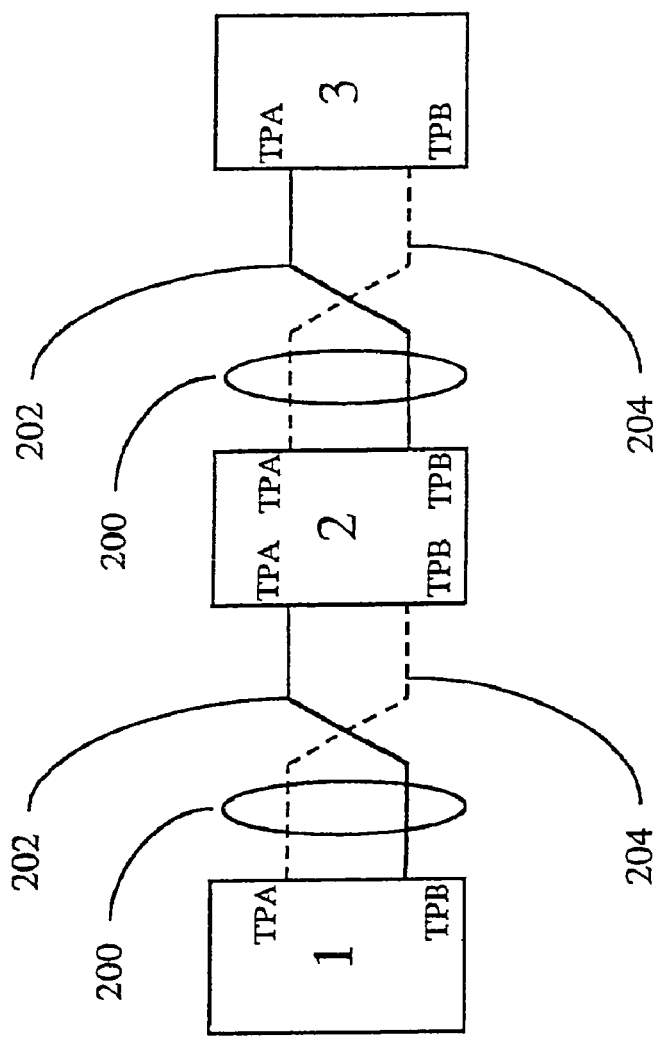
FIG. 3 is a diagram of a prior art P1394b system.
Figure 4:
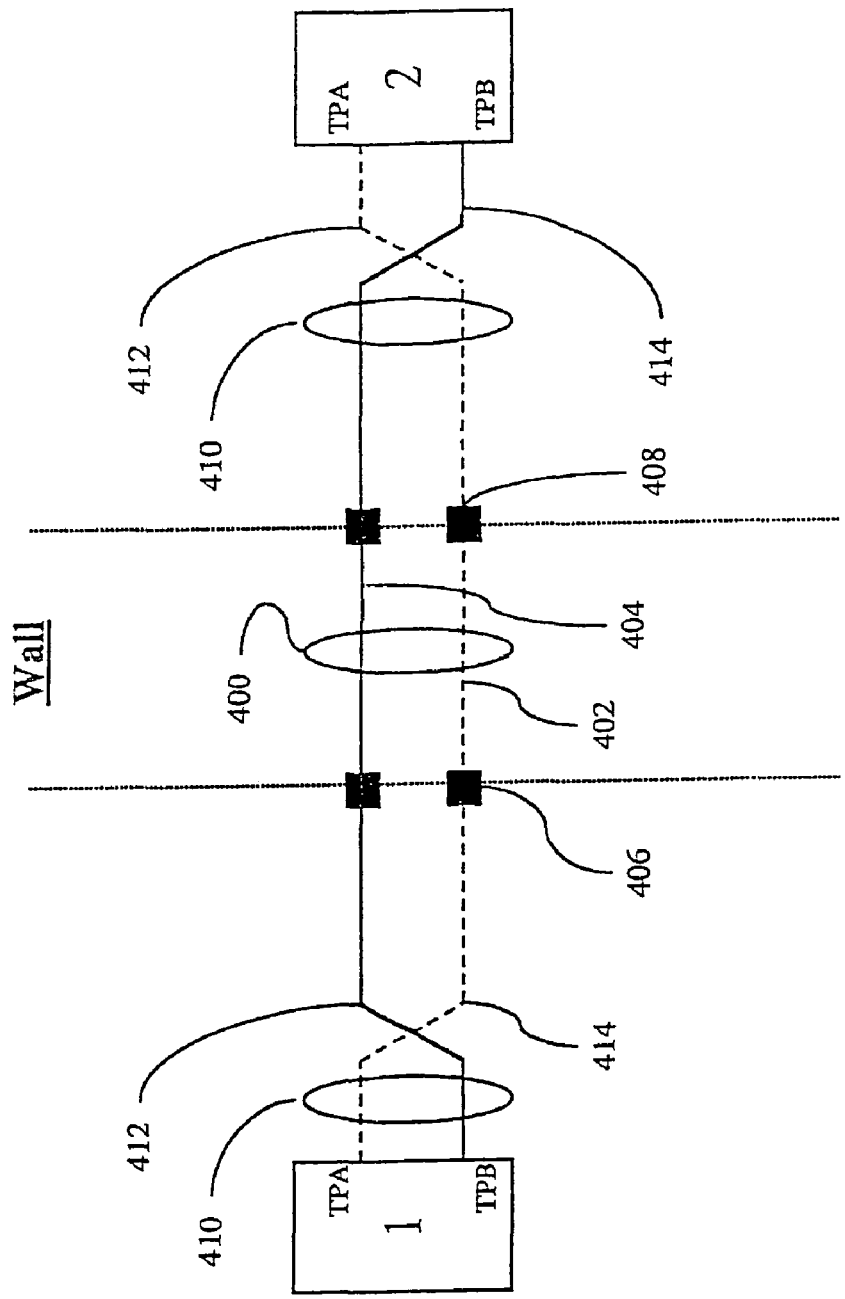
FIG. 4 is a diagram of a prior art P1394b system.

Persons of ordinary skill in the art will realize that the following description of the present invention is illustrative only and not in any way limiting. Other embodiments of the invention will readily suggest themselves to such skilled persons having the benefit of this disclosure.

The present invention relates to data communications. In particular, the present invention relates to automatic detection of signal pair crossover on a high performance serial bus system.

The invention further relates to machine readable media on which are stored embodiments of the present invention. It is contemplated that any media suitable for retrieving instructions is within the scope of the present invention. By way of example, such media may take the form of magnetic, optical, or semiconductor media.

The present invention relates to data structures and the transmission of such data structures. It is contemplated that the present invention may be embodied in various computer and machine readable data structure. Furthermore, it is contemplated that data structures embodying the present invention will be transmitted across computer and machine readable media.

The present invention may be described through the use of flowcharts. Often, a single instance of an embodiment of the present invention will be shown. As is appreciated by those of ordinary skill in the art, however, the protocols and procedures described herein may be repeated continuously or as often as necessary to satisfy the needs described herein. Accordingly, the representation of the present invention through the use of flowcharts should not be used to limit the scope of the present invention.

The present invention further relates to devices that embody the P1394b standard. By way of example, such devices may include those typically used in an audio/video entertainment system, such as home theater receivers, DVD players, computers, or hand-held devices such as cameras and the like. The devices may also include those industrial in nature, such as test and measurement equipment, professional audio/video recording devices, as well as system control or robotic devices found in an industrial environment.

The invention also relates to nodes and physical computers, such as state machines. The present invention may be embodied in any collection of nodes linked together through a bus. Typically, each device connected to the bus will also have one corresponding node physical layer controller embedded therein. However, a given device may have more than one node, and therefore it follows that one device may have more than one connection to more than one bus. For the discussion that follows, the examples will show the typical situation where one node corresponds to one device.

Each node may communicate to other nodes in a P1394b-compatible system though links. Typically, a cable is used for a link, as is provided for in the P1394 standard. However, any communication means may be employed. By way of example, an infrared, RF, or other wireless system may be used, as well as an optical system.

Typically, a link is coupled to a node through a port. A port transmits and receives messages and data between the node and link. As is known by those of ordinary skill in the art, each node may have more than one port.

Figure 5:
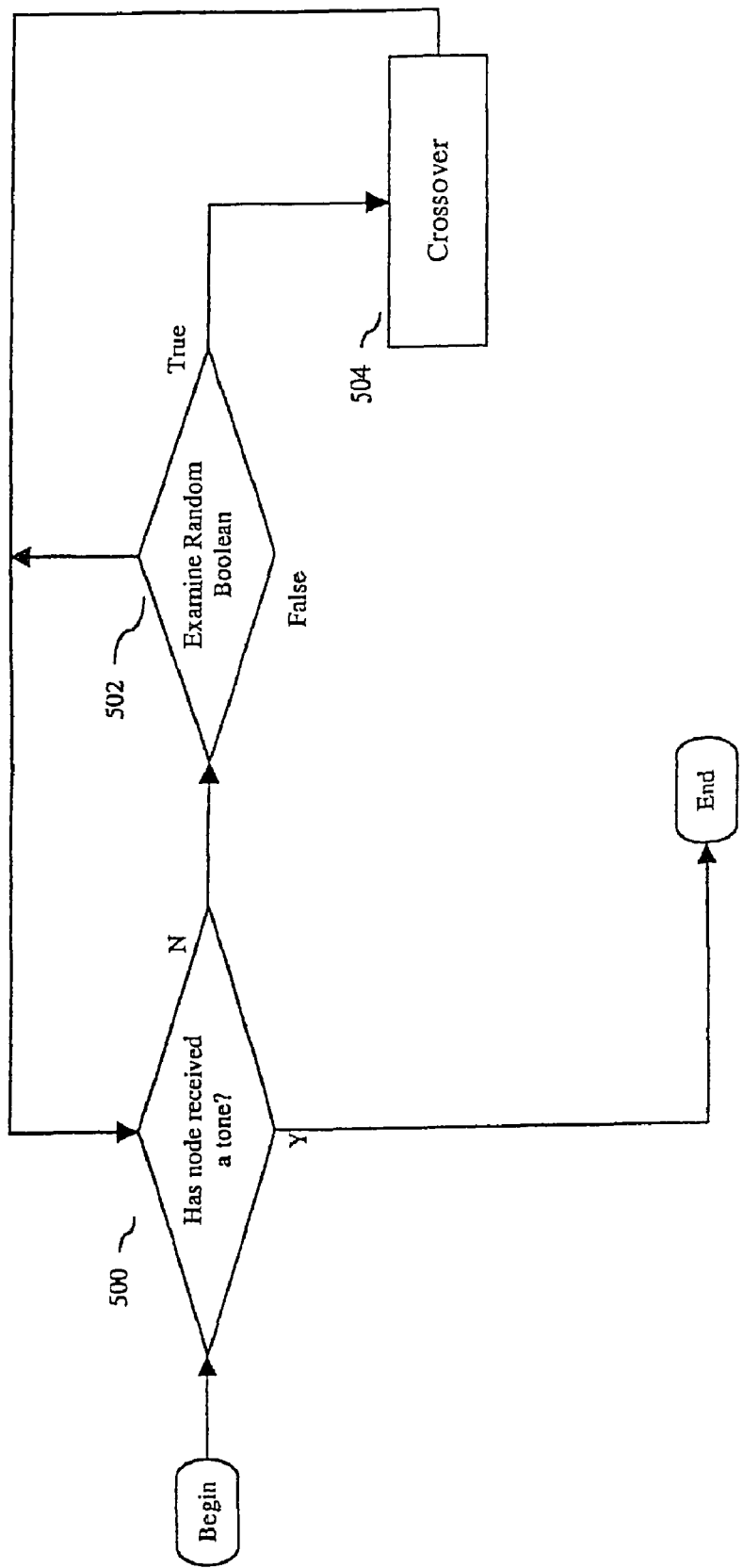
FIG. 5 is a flowchart of a first aspect of a crossover process according to the present invention.

FIG. 5 is a flowchart of a method for automatically healing a crossover according to the present invention. FIG. 5 provides an excellent overview of the present invention. The process begins with act 500 in which a node which wishes to connect to a bus listens for a connect tone.

As is appreciated by those of ordinary skill in the art, P1394b implements a unique joining sequence that is triggered when a PHY is powered up. When a PHY is powered up, it sends out a signal detect tone on the bus. When a PHY is on the bus and hears the signal detect originating from another PHY, the PHYs acknowledge each other and move onto a connection detect stage, and eventually join each other on the bus.

Thus, in query 500 a PHY which wishes to connect to the bus is listening for the signal detect originating from another PHY. If the PHY receives a tone, then the PHY is not suffering from a crossover and therefore must be correctly coupled, and the process ends.

If the PHY does not receive a tone, then there is possibly a crossover that needs to be healed, and the process moves to query 502. In query 502, the PHY examines a Boolean variable to see whether it should implement a crossover. The Boolean variable is provided to prevent the condition where two PHYs are attempting to heal a crossover at the same time. Any means for generating a random true-false value may be employed in the present invention. In an exemplary non-limiting embodiment of the present invention, the random Boolean generator used for the root node contention algorithm in the P1394b is employed for the present invention.

If a false value is returned in query 502, then the process will return to query 500 to see if it has received a tone. If a true value is returned in query 502, then the process moves to act 504.

In act 504, the port will internally crossover its connection internally by swapping TPA and TPB. The result of this is that, for the duration of the "cross-over healing", the internal transmit logic of the port will use TPA (instead of TPB) and the internal receive logic of the port will use TPB (instead of TPA). Preferred methods for implementing a crossover according to the present invention will be disclosed below.

After the crossover is accomplished in act 504, the process of FIG. 5 repeats by moving back to query 500. If the crossover solved the problem, then a tone should be heard in query 500, and the process of FIG. 5 will end.

Figure 6:
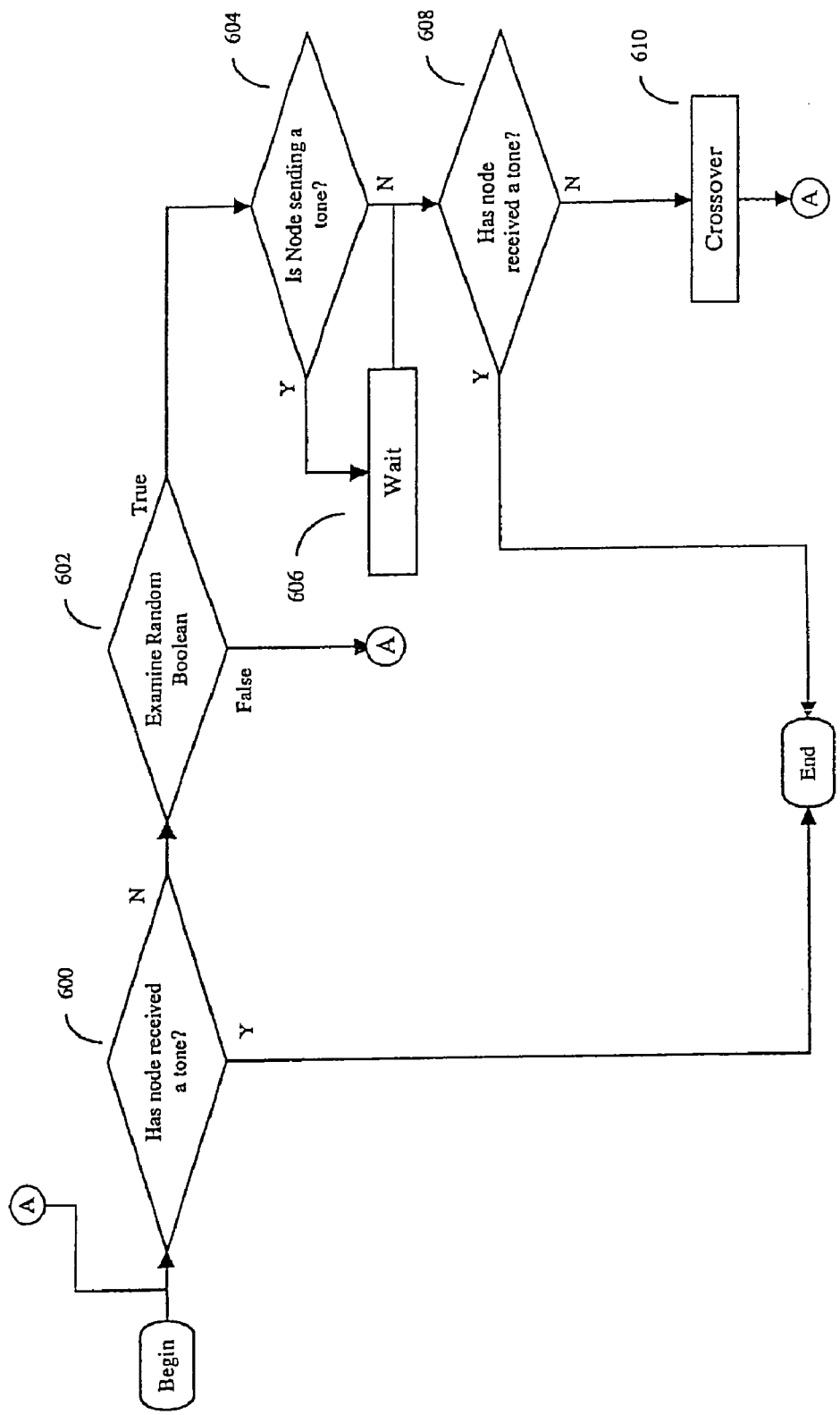
FIG. 6 is a flowchart of a second aspect of a crossover process according to the present invention.

FIG. 6 is a flowchart of another aspect of the present invention. FIG. 6 provides a more detailed embodiment which takes into account contingencies which may occur in actual practice.

In query 600, the PHY which wishes to join listens for a tone. This act is substantially similar to query 500 in FIG. 5, above. If the PHY receives a tone, then the process of FIG. 6 ends, as there is no crossover.

If the PHY does not receive a tone, then there is possibly a crossover that needs healing, and the process moves to query 602.

In query 602, the PHY will examine a random Boolean variable. This query is substantially similar to query 502 in FIG. 5, above.

If the result of query 602 is false, then the process of FIG. 6 moves back to query 600 through connector A. If the result of query 602 is true, then the process moves to query 604.

In query 604, the PHY determines whether it is still sending out a tone. As is appreciated by those of ordinary skill in the art, a PHY will send out four tones in P1394b. It is desired that a PHY will not implement a crossover while it is still sending out a tone, as this would result in first part of the tone being transmitted on one pair, and the remaining part of the tone being transmitted on the other pair. Thus, if the PHY is still sending out tones in query 604, then the process will move to act 606 where the PHY will wait for a predetermined amount of time. In an exemplary non-limiting embodiment of the present invention, the PHY will wait in act 606 until it is finished sending out tones.

After the PHY has waited an appropriate amount of time in act 606, or if the PHY is not sending out tones and the result of query 604 is negative, then the process moves to query 608.

Query 608 provides for a safe harbor in case tones have appeared while the PHY was working through the process of FIG. 6. In query 608, the PHY once again checks to see whether it has received a tone. If the PHY has received a tone, then there was no crossover in the first place, and the process of FIG. 6 ends.

If the PHY still has not received a tone, then there is possibly a crossover that requires healing, and the process moves to act 610.

In act 610, the PHY implements a crossover healing process substantially similar to act 504 in FIG. 5. When the PHY has finished the crossover healing of act 610, the process of FIG. 6 will move back to query 600 through connector A to see if the crossover has solved the problem. If the crossover has solved the problem, the tone should be heard in query 600, and the process of FIG. 6 will end. If not, the process of FIG. 6 will repeat itself.

Figure 7:
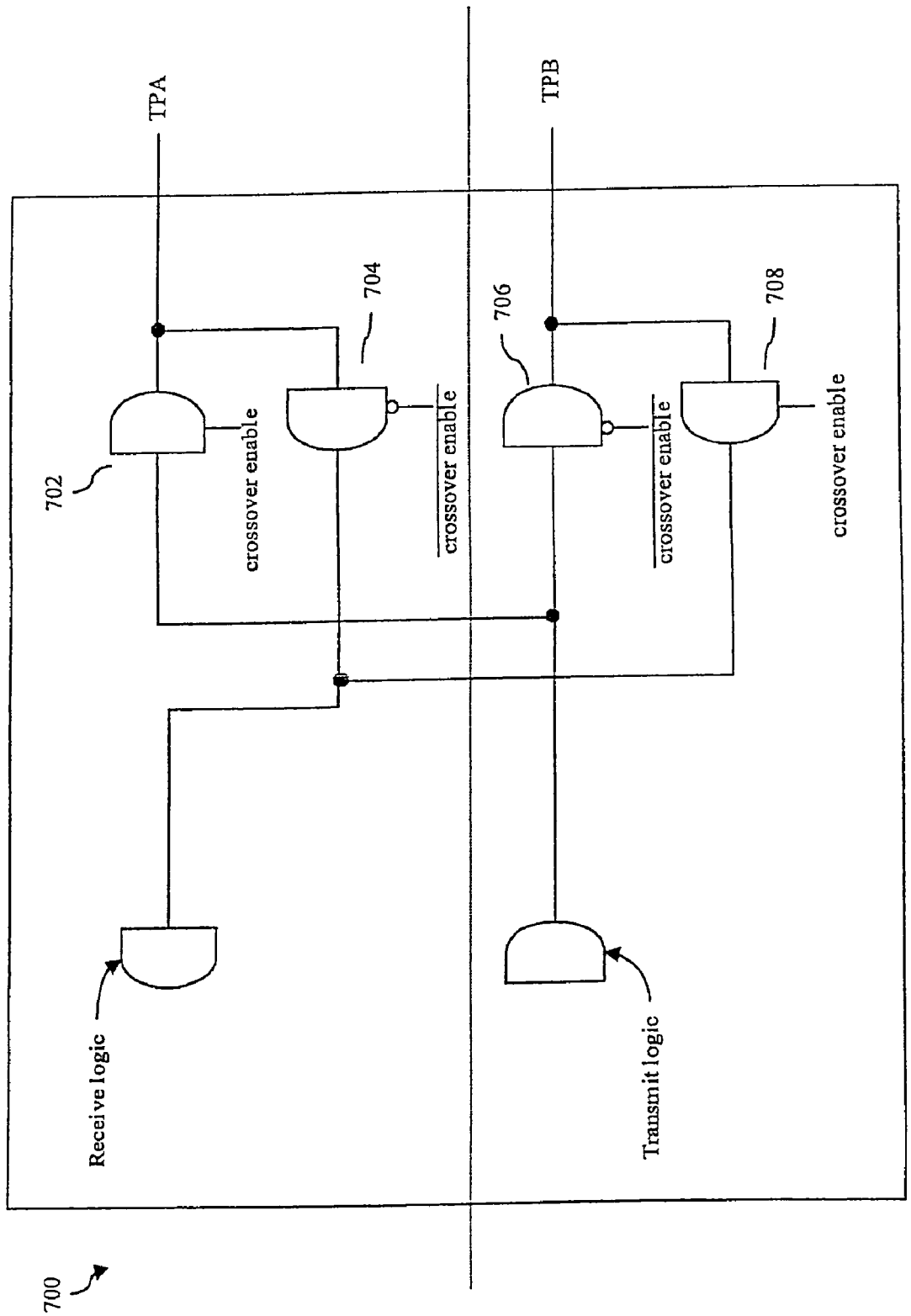
FIG. 7 is a schematic of crossover circuitry according to the present invention.

FIG. 7 is a schematic diagram of crossover logic according to the present invention. FIG. 7 shows a P1394b-compliant port 700 having transmit and receive logic standard in the art for implementing the P1394b standard.

FIG. 7 show the transmit logic couple to connection point TPB through passgate 706. Passgate 706, and all passgates shown in FIG. 7, may be implemented through any means standard in the art, such as a standard parallel CMOS configuration, or a latch. The transmit logic is also coupled to connection point TPA through passgate 702.

The receive logic is coupled to connection point TPA through passgate 704. The receive logic is also coupled to connection point TPB through passgate 708.

A crossover enable signal is provided to passgates 702 and 708. An inverted crossover enable is provided to passgates 704 and 706. It is contemplated that the crossover enable signal may be inverted through any means standard in the art, such as an inverter. In a preferred embodiment of the present invention, the crossover enable signal and the inverted crossover enable signals are provided to the common gate of their respective passgates to provide a means for switching TPA and TPB.

In operation, the crossover enable signal is normally low. As can be seen by inspection of FIG. 7, a low crossover enable signal will couple the receive logic to TPA through passgate 704 which will be on because of the low crossover enable signal being applied. The normally low crossover enable signal will also couple the transmit logic to TPB through passgate 706, which will be on by virtue of the low crossover enable signal applied to it.

In a preferred embodiment of the present invention, the logical state of the crossover enable signal will be determined by the processes disclosed in FIGS. 5 and 6. When the processes of FIGS. 5 and 6 result in a crossover act being required, the crossover enable signal will be brought high by circuitry on the PHY. This circuitry may be any circuitry standard in the art for implementing the P1394b standard and is not shown in FIG. 7.

As can be seen by inspection of FIG. 7, when the crossover enable signal is brought high, passgates 702 and 708 will be turned on, and pass-gates 704 and 706 will be turned off, thus coupling the receive logic to connection point TPB and coupling the transmit logic to connection point TPA.

Thus, the circuitry of FIG. 7, with the processes of FIGS. 5 and 6, provide a simple and effective means for automatically implementing a crossover and eliminates the need for patch cables, and allows the user to connect the system with many different types of patch cords without fear that the system will fail. Thus, with the advantages provided by the present invention, a user may connect a P1394b-compliant system with a cable that employs an internal crossover, or a non-crossover patch cable, and the system will function regardless of which cable the user employs.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A data communication apparatus comprising:
   a transmit interface configured to transmit a first predetermined signal on power up;
   a receive interface configured to receive a second predetermined signal;
   the data communication apparatus configured to perform a crossover function if the receive interface does not receive the second predetermined signal, the crossover function comprising:
   examining a random value, the random value being determined by an algorithm, and if the value of the random value meets a predetermined criterion, then:
   configuring the transmit interface to receive the second predetermined signal; and configuring the receive interface to transmit the first predetermined signal;

wherein the algorithm is also utilized for another purpose within the data communication apparatus.

2. The data communication apparatus of claim 1, wherein the another purpose comprises resolving contention between two or more nodes of a network using a serialized bus protocol.

3. The data communication apparatus of claim 2, wherein the first predetermined signal comprises a signal detect tone.

4. The data communication apparatus of claim 3, wherein the signal detect tone comprises a signal detect tone compliant with IEEE Std.1394b.

5. The data communication apparatus of claim 4, wherein the second predetermined signal comprises a signal detect tone.

6. The data communication apparatus of claim 5, wherein the second predetermined signal comprises a signal detect tone compliant with IEEE Std.1394b.

7. The data communication apparatus of claim 6, wherein the random value comprises a Boolean variable.

8. The data communication apparatus of claim 7, wherein the predetermined criterion comprises a Boolean "true" value.

9. The data communication apparatus of claim 8, wherein the crossover function further comprises, if the value of the random value does not meets a predetermined criterion, continuing listening for the second predetermined signal on the receive interface.

10. A communication network comprising at least two nodes and a communication bus, wherein:

the at least two nodes communicate with each other over the communication bus without an intervening crossover interface; and at least one of the at least two nodes is configured for detection and healing a crossover in communication, the detection and healing comprising:

detecting an absence of a first signal;

determining whether a signal interface of the at least one of the at least two nodes is generating a second signal; and responsive to a probabilistic function and the acts of detecting and determining, switching between a transmit port and a receive port.

11. The communication network of claim 10, wherein the crossover interface comprises a cable, and the at least two nodes comprise nodes compliant with IEEE Std.1394b.

12. The communication network of claim 11, wherein the first signal comprises a signal detect tone compliant with IEEE Std.1394b.

13. The communication network of claim 12, wherein the probabilistic function comprises a Boolean function.

14. The communication network of claim 13, wherein the probabilistic function is used by the at least two nodes for root node decision.

15. The communication network of claim 14, wherein the detection and healing further comprises transmitting a predetermined number of transmissions of a second signal.

16. The communication network of claim 15, wherein the switching between the transmit port and the receive port only occurs when the at least one of the at least two nodes is not generating the second signal.

17. The communication network of claim 16, wherein the predetermined number of transmissions is four (4).

18. The communication network of claim 17, where the detection and healing further comprises waiting, responsive to an outcome of the checking, for a predetermined time period.

19. The communication network of claim 18, where the detection and healing further comprises detecting, after the predetermined time period, the first signal.

20. A communication system, comprising:

an interface comprising a first communication path and a second communication path; and at least one node including a logic circuit comprising a receive circuit and a transmit circuit;

wherein:

the transmit circuit is connected to a first and a second communication paths via a first passgate, and the receive circuit is connected to the first and the second communication paths via a second passgate;

the first passgate configured to, in combination with a crossover function and in response to a crossover enable signal, connect the transmit circuit either to the first communication path or the second communication path; and the second passgate configured to, in combination with the crossover function and in response to the crossover enable signal, connect the receive circuit either to the first communication path or the second communication path; and wherein a logical state of the crossover enable signal is responsive to detection of a signal on the second communication path and a value of a first variable, the value of the first variable being determined by an algorithm that is utilized for another purpose in addition to the crossover function.

21. The communication system of claim 20, wherein the interface comprises a cable compliant with IEEE Std.1394b.

22. The communication system of claim 21, wherein the at least one node comprises a node compliant with IEEE Std.1394b.

23. The communication system of claim 22, wherein the interface comprises a cable having an internal crossover.

24. The communication system of claim 22, wherein the interface comprises a non-crossover patch cable.

25. The communication system of claim 22, wherein the crossover enable signal is inverted before provision thereof to the second passgate.

26. The communication system of claim 22, wherein a logical state of the crossover enable signal is changed in response to absence of a first signal on the first communication path.

27. The communication system of claim 26, wherein the first signal comprises a tone signal compliant with IEEE Std.1394b.

28. The communication system of claim 27, wherein the another purpose comprises resolving contention between the at least one node and one or more other nodes of a network using a serialized bus protocol.

29. A home network comprising at least two devices and a communication bus, wherein:

the communication bus comprises a first signal transmission path and a second signal transmission path; and at least one of the at least two devices comprises a physical layer configured to detect reception of a signal on the second signal transmission path; and if the physical layer has not received the signal, then responsive to the lack of receipt of the signal examining a variable associated with a randomized function and implementing, by the physical layer, a crossover process.

30. A method of forming a network comprising:
transmitting a first signal on a first interface;
waiting for a predetermined period of time after completion of the transmitting;
checking at a second interface, after the predetermined period of time is over after the transmitting, if a second signal is received; and
if the second signal is received at the second interface, then attempting to form a network; and
if the second signal is not received at the second interface, and the first signal is determined not to be transmitted on the first or second interface at that time, then performing detection of the second signal on the first interface.

31. A data communication apparatus comprising:
a first interface configured to transmit at least a first signal;
a second interface configured to receive at least a second signal; and
logic in signal communication with the first interface and the second interface, and configured to:
wait for a predetermined period after transmission of the first signal; and
check the second interface, after the predetermined period has expired, to determine if the second signal is received; and
wherein the logic is further configured to:
if the second signal is received at the second interface, then attempt to form a network; and
if the second signal is not received at the second interface, and the first or second interfaces are not in use at that time, then perform detection of the second signal on the first interface.

32. The data communication apparatus of claim 31, wherein the first and second signals each comprise a signal detect tone.

33. The data communication apparatus of claim 32, wherein the signal detect tones comprise signal detect tones compliant with a high speed serialized bus protocol.

34. The data communication apparatus of claim 33, wherein the serialized protocol is compliant with at least one version of IEEE Std.1394.

35. The data communication apparatus of claim 31, wherein the first and second interfaces comprise interfaces compliant with a high speed serialized bus protocol.

36. The data communication apparatus of claim 31, wherein the data communication apparatus is configured to operate with both (i) a cable having no internal crossover between first and second pathways associated with the first and second interfaces, respectively; and (ii) a cable having an internal crossover between first and second pathways associated with the first and second interfaces, respectively.

37. The data communication apparatus of claim 31, wherein the apparatus is further configured to transmit said first signal upon power-up.

38. A data communication apparatus comprising:
a first interface configured to transmit at least a first signal;
a second interface configured to receive at least a second signal; and
logic in signal communication with the first interface and the second interface, and configured to:
check the second interface to determine if the second signal is received;
if the second signal is received at the second interface, attempt to form a network; and
if the second signal is not received at the second interface, and one or more of the first or second interfaces are in use at that time, then:
(i) wait for a predetermined period; and
(ii) after expiration of the period, perform detection of the second signal on the first interface.

39. The data communication apparatus of claim 38, wherein the first and second signals each comprise a signal detect tone.

40. The data communication apparatus of claim 39, wherein the signal detect tones comprise signal detect tones compliant with a high speed serialized bus protocol.

41. The data communication apparatus of claim 40, wherein the serialized protocol is compliant with at least one version of IEEE Std.1394.

42. The data communication apparatus of claim 31, wherein the first and second interfaces comprise interfaces compliant with a high speed serialized bus protocol.

43. The data communication apparatus of claim 38, wherein the data communication apparatus is configured to operate with both (i) a cable having no internal crossover between first and second pathways associated with the first and second interfaces, respectively; and (ii) a cable having an internal crossover between first and second pathways associated with the first and second interfaces, respectively.

44. The data communication apparatus of claim 38, wherein the apparatus is further configured to transmit said first signal upon power-up.

* * * * *

UNITED STATES PATENT AND TRADEMARK OFFICE
CERTIFICATE OF CORRECTION

| | | |
|---|---|---|
| PATENT NO. | : 7,861,025 B2 | Page 1 of 1 |
| APPLICATION NO. | : 12/218366 | |
| DATED | : December 28, 2010 | |
| INVENTOR(S) | : Colin Whitby-Strevens | |

It is certified that error appears in the above-identified patent and that said Letters Patent is hereby corrected as shown below:

In column 2, line 44, delete "sirnplex" and insert -- simplex --, therefor.

In column 8, line 33, delete "pass-gates" and insert -- passgates --, therefor.

Signed and Sealed this
First Day of November, 2011

David J. Kappos
*Director of the United States Patent and Trademark Office*